（12） United States Patent
Raskar

(10) Patent No.: US 6,520,647 B2
(45) Date of Patent: Feb. 18, 2003

(54) AUTOMATIC KEYSTONE CORRECTION FOR PROJECTORS WITH ARBITRARY ORIENTATION

(75) Inventor: Ramesh Raskar, Somerville, MA (US)

(73) Assignee: Mitsubishi Electric Research Laboratories Inc., Cambridge, MA (US)

( * ) Notice: Subject to any disclaimer, the term of this patent is extended or adjusted under 35 U.S.C. 154(b) by 0 days.

(21) Appl. No.: 09/930,532

(22) Filed: Aug. 15, 2001

(65) Prior Publication Data

US 2002/0021418 A1 Feb. 21, 2002

Related U.S. Application Data

(60) Provisional application No. 60/226,066, filed on Aug. 17, 2000.

(51) Int. Cl.$^7$ ............................................... G03B 21/14
(52) U.S. Cl. ................................... 353/70; 353/69
(58) Field of Search ........................... 353/69, 70, 121; 348/745, 744, 746, 747

(56) References Cited

U.S. PATENT DOCUMENTS

| | | | | |
|---|---|---|---|---|
| 5,548,357 A | | 8/1996 | Appel et al. ................ 353/69 |
| 5,601,353 A | * | 2/1997 | Naimark et al. ............. 348/36 |
| 5,795,046 A | | 8/1998 | Woo .......................... 353/69 |
| 6,222,593 B1 | * | 4/2001 | Higurashi et al. ...... 315/368.12 |
| 6,367,933 B1 | * | 4/2002 | Chen et al. ............... 348/744 |

* cited by examiner

Primary Examiner—Russell Adams
Assistant Examiner—Andrew Sever
(74) Attorney, Agent, or Firm—Dirk Brinkman; Andrew J. Curtin

(57) ABSTRACT

A method corrects keystoning in a projector arbitrarily oriented with respect to a display surface. An elevation angle, a roll angle, and an azimuth angle of an optical axis of the projector are measured with respect to the display surface. A planar projective transformation matrix is determined from the elevation, roll, and azimuth angles. A source image to be projected by the projector is warped according to the planar projective transformation, and then projected onto the display surface.

8 Claims, 4 Drawing Sheets

AUTOMATIC KEYSTONE CORRECTION FOR PROJECTORS WITH ARBITRARY ORIENTATION

CROSS-REFERENCE TO RELATED APPLICATIONS

A claim of priority is made to U.S. Provisional Patent Application Serial No. 60/226,066, filed Aug. 17, 2000, entitled AUTOMATIC KEYSTONE CORRECTION FOR PROJECTORS WITH ARBITRARY ORIENTATION.

FIELD OF THE INVENTION

This invention relates generally to image projectors, and more particularly, to correcting keystoning problems in projected images.

BACKGROUND OF THE INVENTION

Portable digital image projectors are common. These projectors, while connected to a PC or VCR, sit on a table and are aimed at a projection surface to show a "slide" presentation or a video. Many of these projectors use transmission LCDs, and typically only have a single main lens. The projectors can display images one at the time or as a sequence of images.

These projectors are typically designed so that level undistorted images are projected on the projection surface when the projector is placed horizontally on a level support surface, so that the projector's optical axis is lined up perpendicular to the, typically, vertical projection surface. If any of the above assumptions is violated, then the resulting image on the projection surface may not be rectangular and will be, at best, a trapezoid, and at worst an arbitrary quadrilateral. This problem is called keystoning.

With prior art projectors, the only way to correct keystoning is to tediously adjust the physical position of the projector by moving it around, tilting and rotating it, until a near rectangular image is displayed. In some cases, it may be impossible to physically adjust the position of the projector. For example, the projector may need to be well above or below the display surface. Some prior art projectors correct the distorted image optically or by the user providing projector positional data.

U.S. Pat. No. 5,548,357, "Keystoning and focus correction for an overhead projector," issued to Appel et. al. on Aug. 18, 1998, describes a system where a test slide is displayed. A user identifies line pairs most parallel to each other. The line pair identification activates a distortion correction program that uses the oblique angle between the horizontal plane through the projector and the viewing screen.

U.S. Pat. No. 5,795,046, "Method for pre-compensating an asymmetrical picture in a projection system for displaying a picture," issued to Woo on August 1998, describes a system where the projection angle, and the trapezoidal error, is compensated for by the user entering in positional information into the system via a keyboard.

SUMMARY OF THE INVENTION

A method corrects keystoning in a projector arbitrarily oriented with respect to a display surface. An elevation angle, a roll angle, and an azimuth angle of an optical axis of the projector are measured with respect to the display surface.

A planar projective transformation matrix is determined from the elevation, roll, and azimuth angles. A source image to be projected by the projector is warped according to the planar projective transformation, and then projected onto the display surface.

DETAILED DESCRIPTION OF THE PREFERRED EMBODIMENT

Figure 1B:
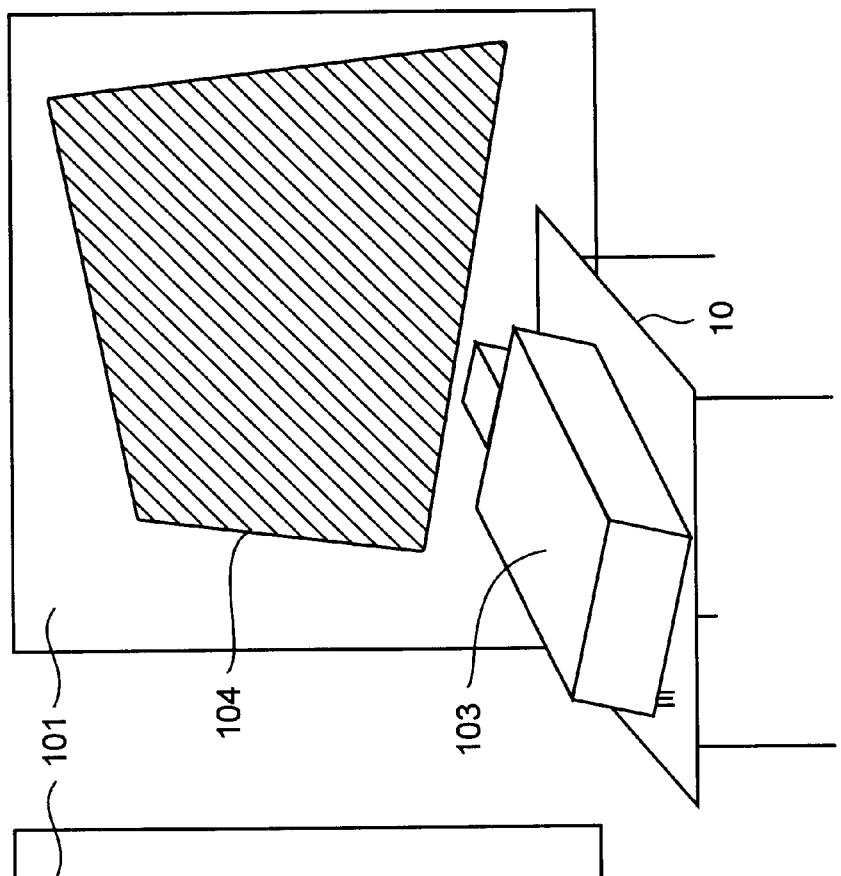
FIG. 1b is a illustration of a projector oriented obliquely to the planar display surface.
Figure 1A:
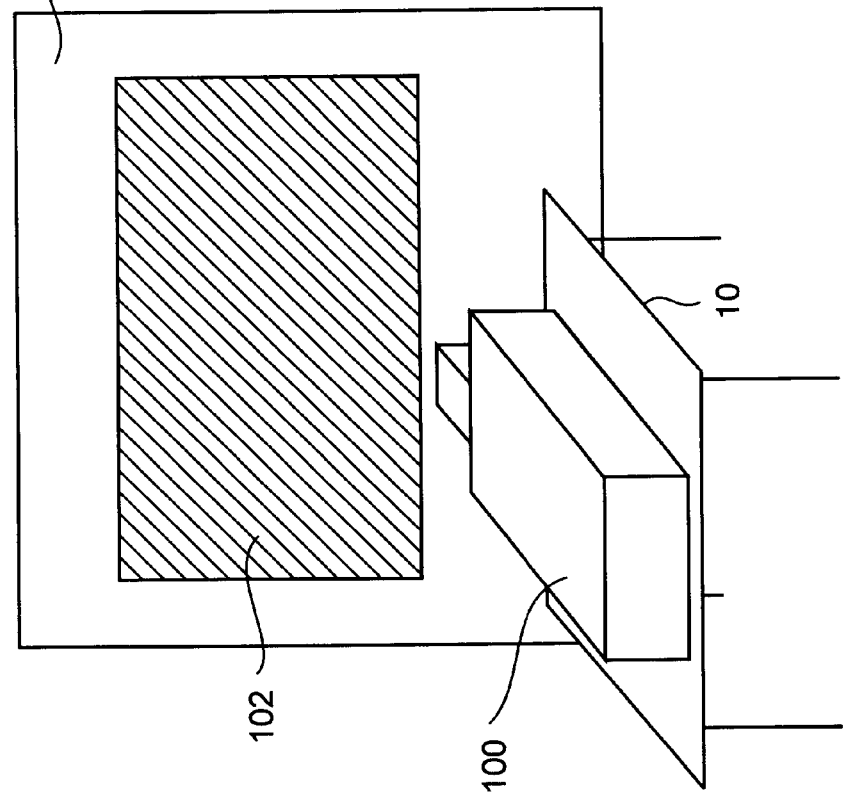
FIG. 1a is a illustration of a projector oriented perpendicularly to a planar display surface.

FIG. 1a show a projector 100 placed on a table 10 and oriented at a display surface 101 so that a projected image 102 is perfectly rectangular. This requires that the optical axis of the projector 100 be perfectly aligned perpendicularly to the plane of the display surface 101, and that there is no rotation about the optical axis.

FIG. 1b shows a projector 103 placed obliquely on the table 10 and aimed at the display surface 101. In this case, a projected image 104 is some arbitrary shaped quadrilateral due to the oblique angle between the optical axis and the display surface.

The present invention describes a method and system to correct the distorted image 104 to the required rectangular shape 102 as seen in FIG. 1. As a result, this allows a user to casually place a projector on a surface, without being concerned if the table top is perfectly horizontal, and the projectors optical axis is perfect perpendicular to the display surface.

Figure 3A:
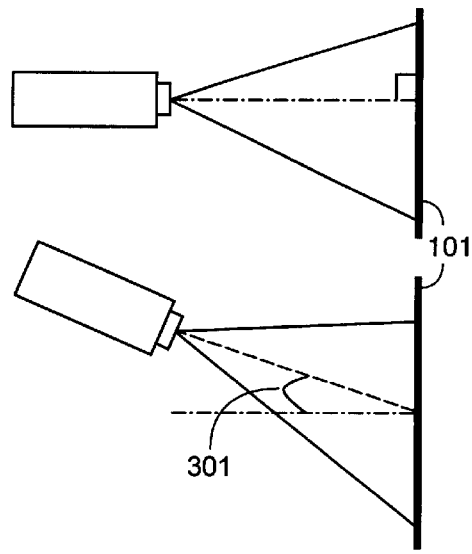
FIGS. 3a–3c illustrate three rotational angles associated with projectors.
Figure 3B:
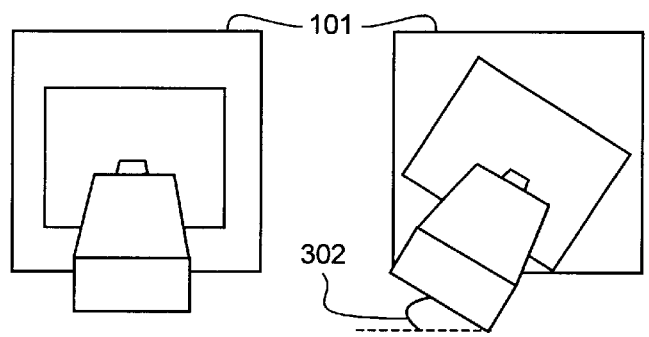

As shown in FIGS. 3a–3b, when the projector is placed obliquely, or the table is titled, or the floor is tilted, or any combinations of these, the obliqueness can be expressed in terms of the three angles, elevation 301, roll 302, and azimuth 303. Each angle is a measurement between the actual angle of the optical axis 311 and the ideal angle 312 of the optical axis, i.e., perpendicular to the display surface and no rotation. In the ideal setup, as shown in FIG. 1, all the three angles are zero.

Figure 2:
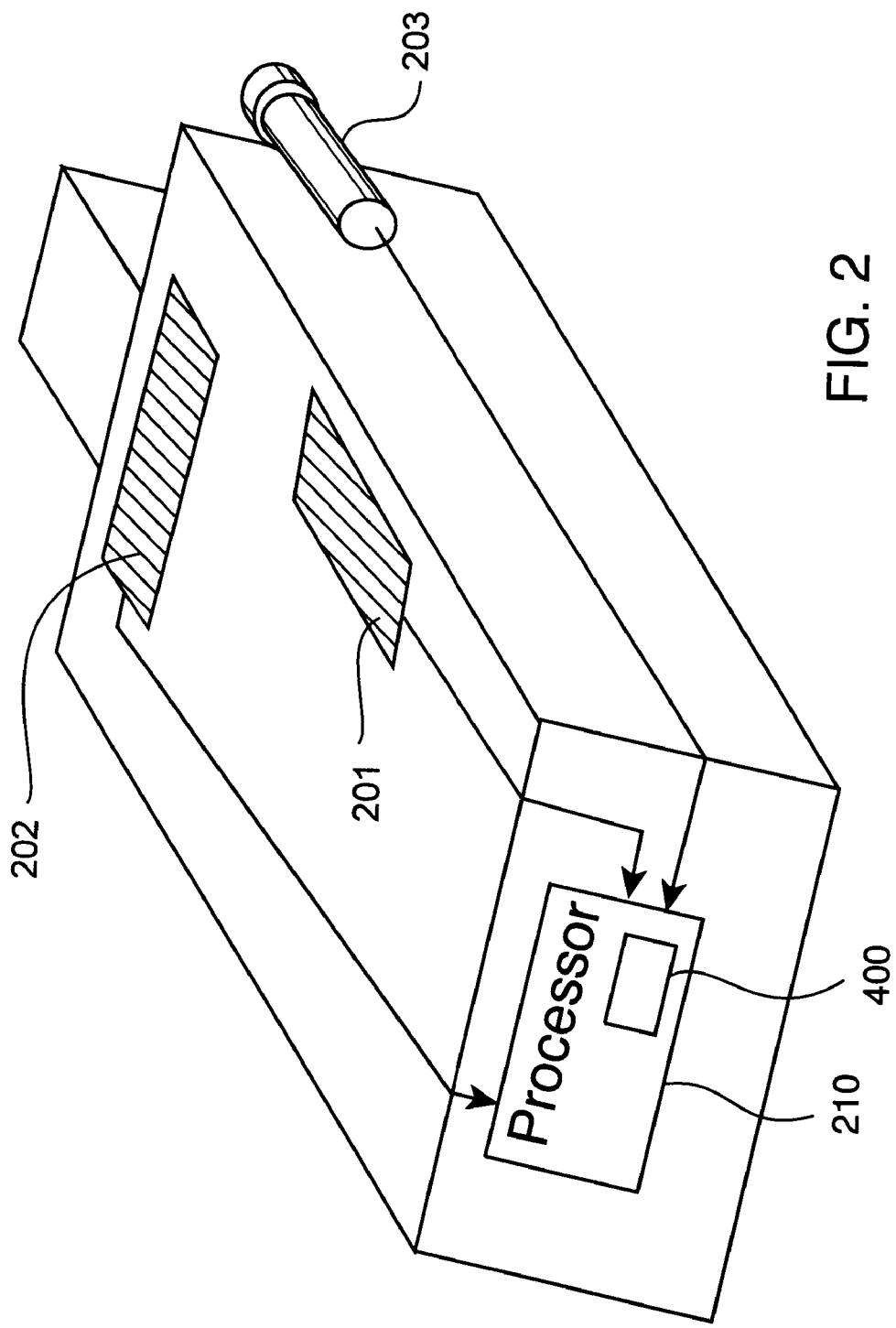
FIG. 2 is a illustration of a projector according to the invention.

In the present invention, the values of these three angles 301–303 are determined automatically using sensors mounted on the projector 200 as shown in FIG. 2. FIG. 2 shows the projector 200 according to the invention. The projector 200 includes multiple sensors, e.g., tilt sensor 201–302, and a camera 203. The sensors 201–302 can also be accelerometer implemented using 2D-accelerometer boards, for example, the ADXL-202 from Analog Devices, Inc. The camera 203 can be any digital camera with digital out-put signals. The camera 203 acquires an input image of a registration image having a predetermined pattern, e.g., a checkerboard pattern. These are well known.

Figure 3C:
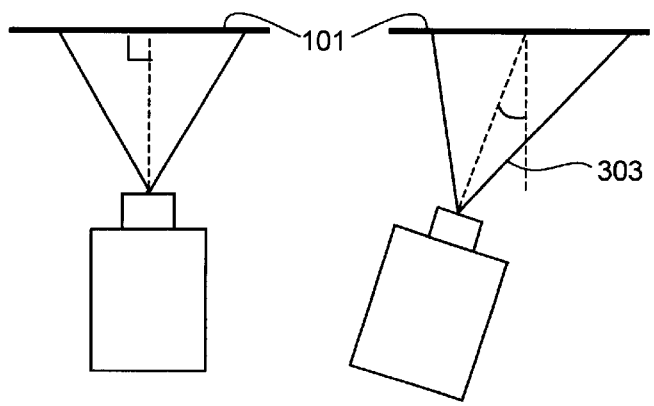

It should be noted that the angles 301–303 shown in FIG. 3 can be sensed by other techniques such as lasers 310, magnetic sensors, or gyro sensors. With fewer sensors, e.g., one or two, some keystoning effects can be compensated. For example, a single sensor can correct for a non-zero elevation angle 301.

The sensors 201–203 are coupled to a processor 210. The processor 210 is conventional in terms of its hardware and operating system software. Application software 211 implements the method 400, see FIG. 4, according to the invention. The method 400 warps images, before they are projected, according to measurements taken by the sensors 201–203. The warping causes the otherwise arbitrary quadrilateral 104 to be projected as a rectangle.

The elevation angle 301 and the roll angle 302 are independent of the geometric relationship between the projector 200 and the display surface 101. Hence, these two angles can be sensed or measured using tilt or gravity sensors. For example, the sensor 201 is placed parallel to the optical axis of the projector, and the sensor 202 that measures the roll angle 302 around the optical axis is placed perpendicular to the optical axis of the projector. The azimuth angle 303 is determined by viewing a projected image with the camera 203.

The azimuth angle 303 is derived from a single planar projective transformation (homography) between pixel locations in the projected image and corresponding pixel locations in an input image acquired by the camera 203 of the projected image, described in greater detail below.

Figure 4:
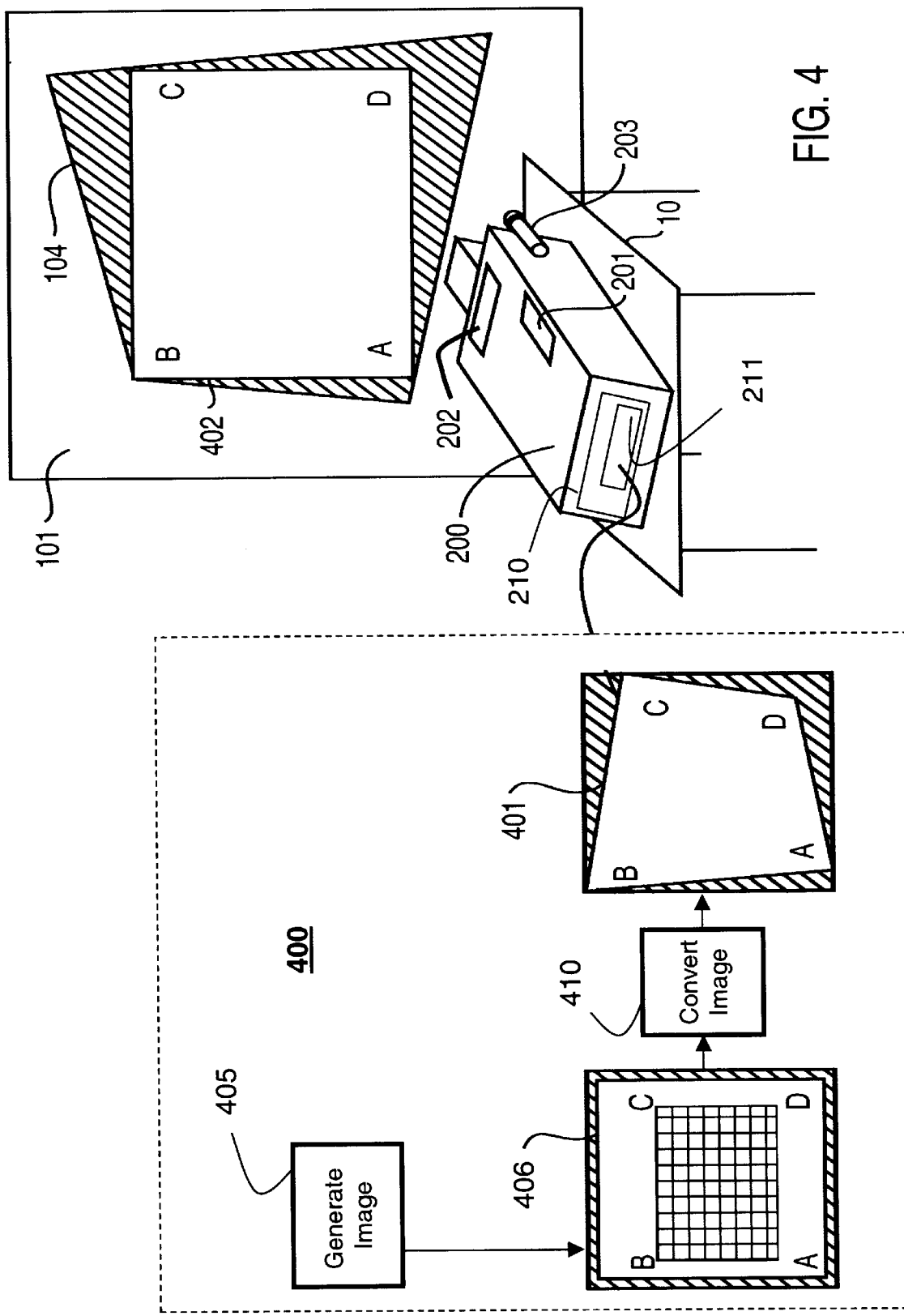
FIG. 4 is a flow diagram of a warping function used by the invention.

FIG. 4 shows the steps of the warping 400 according to the invention. Typically, the computer application 211 generates 405 a rectangular image 406, having corners generally marked A, B, C, and D. The method 400 determines a suitable quadrilateral 401, which when projected onto the display surface 101, appears as a correct displayed image 402, i.e., the image is rectangular and axis aligned with the real world sense of what is horizontal and vertical.

The method 400 converts 410 the image 406 into the quadrilateral (warped) image 401 using the homography determined from the sensor measurements. The warping can be performed by texture mapping or image warping such as is available in conventional rendering engines. The homography is defined by the three angles 301–303. The warped image 401 is the input for the obliquely positioned projector 200 according to the invention. The correct displayed image 402 is an axis aligned rectangle that fits inside the quadrilateral 104. In the shown example, the axes are horizontal and vertical directions.

RENDERING PROCESS GIVEN THREE ANGLES USING 3D GRAPHICS

The elevation and roll angles 301–302 are determined directly from the sensor 201–202. The azimuth angle 303 is determined by the following steps. Using the calibrated camera-projector pair, find the location of features in the input image acquired by the camera 203 of the registration image, e.g., corners or lines of the checkerboard pattern. The features are located in 3D in projector coordinate system. The projector coordinate system has a center of projection at the optical center of the projector, and an optical axis along the positive z-axis of the projector coordinate system.

The equation of a plane passing through at least three features is determined. The normal of this plane is $N=[Nx, Ny, Nz]$. A projection in the x-y plane is $N_{xy}=[Nx, Ny, 0]$. The dot product of a normalized $N_{xy}$ and projector optical axis $[0\ 0\ 1]$ is the cosine of the azimuth angle$=\cos^{-1}(N_{xy} \cdot [0\ 0\ 1])$. After the three angles are determined, there are a number of ways of warping and rendering a correct image. Here, is a preferred method.

The projector illuminates an image with width W and height H at a distance D from the projector. This situation can be represented by a 3D coordinate system with the projector is at the origin and the illuminated rectangle on the display surface 101 is parallel to the x-y plane at z=D.

The extents of the projected quadrilateral are $[W_{Left}, W_{Right}]$ along x-dimension, and $[H_{Bottom}, H_{Top}]$ along the y-dimension, $W=|W_{Right}-W_{Left}|$ and $H=|H_{Top}-H_{Bottom}|$. This type of projection cone can be represented by a 3×3 perspective projection matrix P indicating the internal parameters of the projector that define the focal length and image center.

The three angles elevation, roll, and azimuth correspond to three 3×3 rotation matrices $R_e$, $R_r$, $R_a$. The goal is to render the source image texture mapped on a rectangle of size W×H. The rectangle is axis aligned in the x-y plane, and centered at the origin. The image is calculated from a rendering camera, with parameters P and the transformation defined below. This will give the required warping effect. A point $[X, Y, 0]$ on the rectangle in x-y plane is mapped to a pixel $[x,y]$ with the following transformation and projection equation:

$$[x\ y\ 1]^T \sim = P*[(R_r*R_e*R_a*[X\ Y\ 0]^T) + [xs, ys, D]^T,$$

where $xs=(W_{Left}+W_{Right})/2$, and $ys=(H_{Bottom}+H_{Top})/2$.

A second method achieves the same effect by warping the source image with a 3×3 homography matrix H between the corresponding set of points $\{m\}$ and $\{n\}$.

If $$[nx\ ny\ 1]^T \sim = P*[(R_r*R_e*R_a*([(mx-xs)(my-ys)0]^T) + [xs, ys, D]^T),$$

then the homography H is given by $$[nx\ ny\ 1]^T \sim = H*[mx\ my\ 0]^T.$$

Four or more pairs of $\{m=(mx, my)\}$ and $\{n=(nx, ny)\}$ are sufficient to determine the homography matrix H. A good set of choices for candidate $\{m\}$ used in homography computation are the corners of the image rectangle W×H.

The invention effectively enables casual placement of a projector to generate correct imagery without distortion eliminating expensive electro-mechanical adjustments. The invention makes it possible to install a projector in any orientation e.g. upside down or resting on its side, and detect the parameters of correct imagery by adding sensors along various directions.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for correcting keystoning in an arbitrarily oriented projection with respect to a display surface, comprising;

directly measuring an elevation angle and a roll angle of an optical axis at a center of projection with respect to the display surface;

determining a planar projective transformation matrix from the elevation and roll angles;

warping a source image to be projected according to the planar projective transformation; and projecting the warped source image onto the display surface.

2. The method of claim 1 wherein the elevation and roll angles are directly measured by sensing a tilt.

3. The method of claim 2, further comprising:

acquiring an input image of a registration image; and determining the azimuth angle from the input image.

4. The method of claim 1 further comprising:

measuring the elevation angle with a tilt sensor.

5. The method of claim 1 further comprising:

directly measuring the roll angle by sensing a tilt.

6. The method of claim 1 further comprising:

measuring the azimuth angle with a camera-projector pair.

7. The method of claim 1 wherein the projector uses a laser beam.

8. A method system for correcting keystoning in a projector arbitrarily oriented with respect to a display surface, comprising;

a first tilt sensor measuring an elevation angle of an optical axis of the projector with respect to the display surface;

a second tilt sensor measuring an elevation angle of an optical axis of the projector with respect to the display surface;

a camera coupled to the projector measuring an azimuth angle of an optical axis of the projector with respect to the display surface;

means for determining a planar projective transformation matrix from the elevation, roll, and azimuth angles;

means for warping a source image to be projected by the projector according to the planar projective transformation and projecting the warped source image onto the display surface with the projector.

* * * * *